(12) United States Patent
Anderson et al.

(10) Patent No.: US 10,452,776 B2
(45) Date of Patent: Oct. 22, 2019

(54) COGNITIVE MEDIATOR FOR GENERATING BLOCKCHAIN SMART CONTRACTS

(71) Applicant: International Business Machines Corporation, Armonk, NY (US)

(72) Inventors: Ryan Anderson, Kensington, CA (US); Joseph Kozhaya, Morrisville, NC (US); Christopher M. Madison, Charlotte, NC (US); John Wolpert, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/663,141

(22) Filed: Jul. 28, 2017

(65) Prior Publication Data

US 2019/0034402 A1    Jan. 31, 2019

(51) Int. Cl.
*G06F 17/24* (2006.01)
*G06Q 40/02* (2012.01)
(Continued)

(52) U.S. Cl.
CPC ......... *G06F 17/248* (2013.01); *G06Q 40/025* (2013.01); *H04L 9/0637* (2013.01);
(Continued)

(58) Field of Classification Search
CPC ........ G06F 17/248; G06F 17/20; G06F 17/21; G06F 17/22; G06F 17/24; G06F 17/243;
(Continued)

(56) References Cited

U.S. PATENT DOCUMENTS 9,495,333 B2    11/2016    Fernandes et al.
9,513,627 B1    12/2016    Elazary et al.
(Continued)

FOREIGN PATENT DOCUMENTS

WO    2016163608 A1    10/2016

OTHER PUBLICATIONS

Christidis et al.; "Blockchains and Smart Contracts for the Internet of Things", IEEE Access, vol. 4, 2016, current version Jun. 3, 2016, pp. 2292-2303.
(Continued)

*Primary Examiner* — Qi Han
(74) *Attorney, Agent, or Firm* — Christopher K. McLane; Alexander G. Jochym

(57) ABSTRACT

In an approach to generating blockchain smart contracts, one or more computer processors receive a request for a service from a user. The one or more computer processors extract one or more features from the request. The one or more computer processors determine one or more smart contract templates associated with the request based, at least in part, on the extracted one or more features. The one or more computer processors receive one or more responses to the request from one or more service providers. The one or more computer processors generate a draft smart contract based, at least in part on the determined one or more smart contract templates and the one or more received responses.

13 Claims, 4 Drawing Sheets

(51) Int. Cl.
*H04L 9/06* (2006.01)
*H04L 9/32* (2006.01)
*G06Q 30/00* (2012.01)

(52) U.S. Cl.
CPC ........... *H04L 9/3239* (2013.01); *G06Q 30/00* (2013.01); *H04L 2209/38* (2013.01)

(58) Field of Classification Search
CPC .... G06F 17/245; G06F 17/246; G06F 17/247; G06F 17/25; G06F 17/27; G06F 17/278; G06F 17/279; G06F 17/28; G06F 17/2836
USPC ...................................... 704/9, 1, 2, 10, 257
See application file for complete search history.

(56) References Cited

U.S. PATENT DOCUMENTS

| | | |
|---|---|---|
| 2015/0332283 A1 | 11/2015 | Witchey |
| 2015/0379510 A1 | 12/2015 | Smith |
| 2016/0028552 A1 | 1/2016 | Spanos et al. |
| 2016/0261690 A1 | 9/2016 | Ford |
| 2016/0299918 A1 | 10/2016 | Ford |
| 2016/0330034 A1 | 11/2016 | Back et al. |
| 2016/0335533 A1 | 11/2016 | Davis et al. |
| 2016/0342976 A1 | 11/2016 | Davis |
| 2016/0342978 A1 | 11/2016 | Davis et al. |
| 2016/0342989 A1 | 11/2016 | Davis |
| 2016/0342994 A1 | 11/2016 | Davis |
| 2017/0177855 A1* | 6/2017 | Costa Faidella ........ G06F 21/45 |
| 2017/0232300 A1* | 8/2017 | Tran ........................ H04L 67/12 434/247 |
| 2017/0353309 A1* | 12/2017 | Gray ....................... G06F 21/53 |

OTHER PUBLICATIONS

Idelberger et al.; "Evaluation of Logic-Based Smart Contracts for Blockchain Systems", Rule ML International Symposium, Jun. 28, 2016, 15 pps.

"Smart contract", Wikipedia, the free encyclopedia, 4 pages, last edited on Apr. 29, 2017.

Wall et al.; "Using Blockchain Technology and Smart Contracts to Create a Distributed Securities Depository", Lund University, Jun. 29, 2016, 88 pps.

IBM, Appendix P, list of patents or patent applications treated as related, filed herewith, 2 pages.

U.S. Appl. No. 15/844,577, filed Dec. 17, 2017.

* cited by examiner

COGNITIVE MEDIATOR FOR GENERATING BLOCKCHAIN SMART CONTRACTS

BACKGROUND OF THE INVENTION

The present invention relates generally to the field of transaction validation technologies, and more particularly to a cognitive mediator for generating blockchain smart contracts.

A blockchain is a decentralized and distributed digital ledger that can record transactions between two or more parties efficiently and in a verifiable and permanent way. The ledger itself can also be programmed to trigger transactions automatically. A blockchain maintains a continuously growing list of records, called blocks, secured from tampering and revision. Each block contains a timestamp and a link to a previous block. By design, blockchains are inherently resistant to modification of the data—once recorded, the data in a block cannot be altered retroactively. Through the use of a peer-to-peer network and a distributed timestamping server, a blockchain database is managed autonomously. The decentralized consensus algorithm of blockchain technologies allows several entities to maintain a shared record of information without having to trust each other individually, since consensus is formed on a per-network basis. The networked model produces a system with the advantages of censorship resistance, tamper resistance, and a system with no single point of failure.

Smart contracts are computer programs that both express the contents of a contractual agreement and operate the implementation of the content, based on triggers provided by users of a smart contract or extracted from a blockchain environment. Smart contracts may have a user interface and often emulate the logic of contractual clauses. Smart contracts aim to provide security superior to traditional contract law and to reduce other transaction costs associated with contracting. Within the context of blockchain, smart contracts are scripts stored on the blockchain. Since they reside on the chain, smart contracts have a unique address. A smart contract is triggered by messages or transactions sent to its address.

SUMMARY

Embodiments of the present invention disclose a method, a computer program product, and a system for generating blockchain smart contracts. The method may include one or more computer processors receiving a request for a service from a user. The one or more computer processors extract one or more features from the request. The one or more computer processors determine one or more smart contract templates associated with the request based, at least in part, on the extracted one or more features. The one or more computer processors receive one or more responses to the request from one or more service providers. The one or more computer processors generate a draft smart contract based, at least in part on the determined one or more smart contract templates and the one or more received responses.

DETAILED DESCRIPTION

Blockchain is gaining popularity as a technology of choice for recording transactions that involve an exchange of services. Smart contracts are computer protocols that facilitate, verify, or enforce a negotiation or performance of a contract. Difficulties may arise when attempting to determine an adequate smart contract for a transaction based on a conversation between two or more parties. Embodiments of the present invention recognize that efficiency may be gained by utilizing a cognitive mediator to dynamically generate a smart contract based on needs identified by the parties involved in the transaction which can map a conversation between the parties using natural language processing (NLP) techniques. Embodiments of the present invention enable the creation of a blockchain smart contract at scale and via natural interactions, based on a set of templates. Implementation of embodiments of the invention may take a variety of forms, and exemplary implementation details are discussed subsequently with reference to the Figures.

Figure 1:
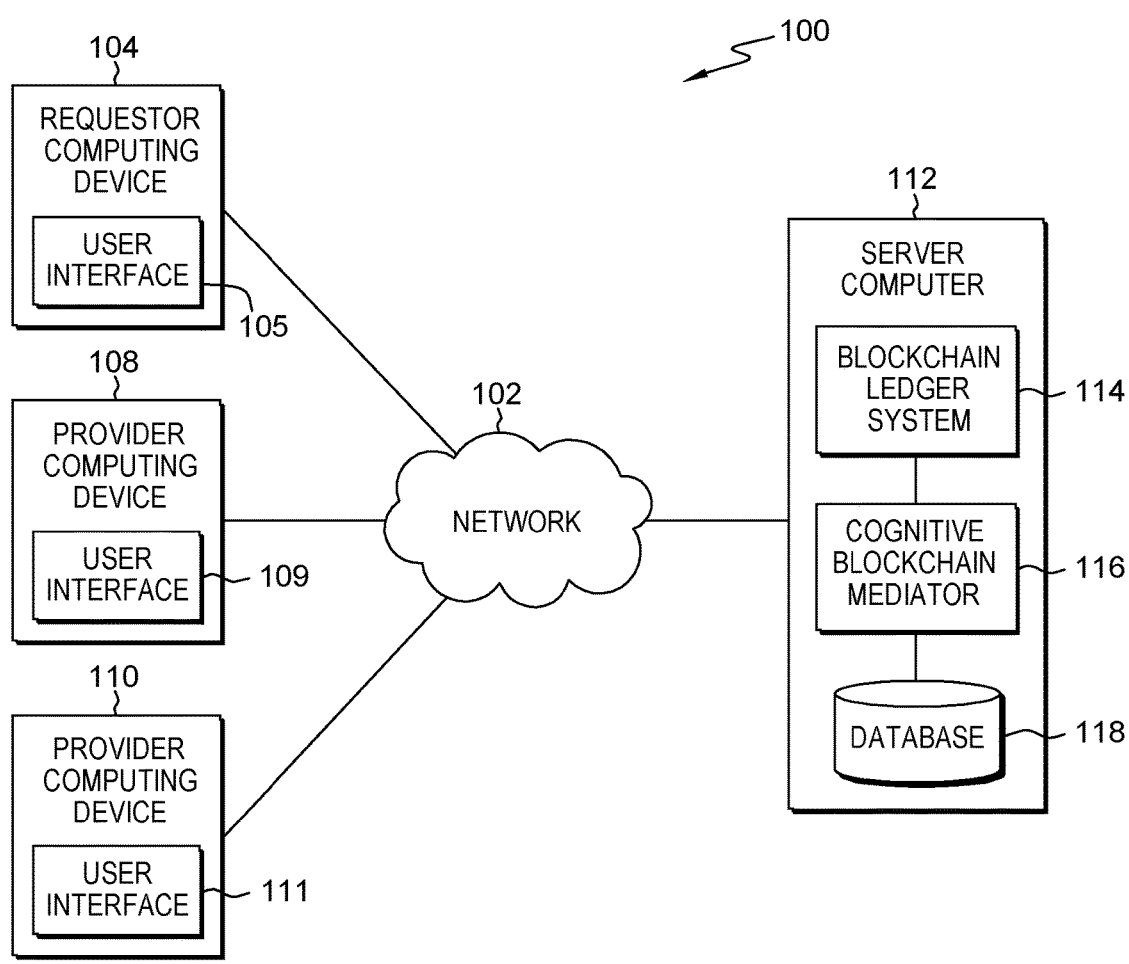
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes requestor computing device 104, provider computing device 108, provider computing device 110, and server computer 112, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between requestor computing device 104, provider computing device 108, provider computing device 110, server computer 112, and other computing devices (not shown) within distributed data processing environment 100.

Requestor computing device 104, provider computing device 108, and provider computing device 110 can each be a laptop computer, a tablet computer, a smart phone, or any programmable electronic device capable of communicating with various components and devices within distributed data processing environment 100, via network 102. In one embodiment, provider computing device 108 and provider computing device 110 can each represent any number of provider computing devices. Requestor computing device 104, provider computing device 108, and provider computing device 110 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, requestor computing device 104, provider computing device 108, and provider computing device 110 each represents one or more programmable electronic devices or combination of programmable electronic devices capable of executing machine readable program instructions and communicating with other computing devices (not shown) within distributed data processing environment 100 via a network, such as network 102. Requestor computing device 104 includes an instance of user interface 105. Provider computing device 108 includes an instance of user interface 109. Provider computing device 110 includes an instance of user interface 111.

User interface 105, user interface 109, and user interface 111 provide an interface between blockchain ledger system 114 on server computer 112 and a user of requestor computing device 104, a user of provider computing device 108, and a user of provider computing device 110, respectively. In one embodiment, user interface 105, user interface 109, and user interface 111 may each be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 105, user interface 109, and user interface 111 may also each be mobile application software that provides an interface between blockchain ledger system 114 on server computer 112 and a user of requestor computing device 104, a user of provider computing device 108, and a user of provider computing device 110, respectively. Mobile application software, or an "app," is a computer program designed to run on smart phones, tablet computers and other mobile devices. User interface 105, user interface 109, and user interface 111 enable a user of requestor computing device 104, a user of provider computing device 108, or a user of provider computing device 110, respectively, to participate with other users in blockchain ledger system 114 by requesting a service or responding to a request.

Server computer 112 can be a standalone computing device, a management server, a web server, a mobile computing device, or any other electronic device or computing system capable of receiving, sending, and processing data. In other embodiments, server computer 112 can represent a server computing system utilizing multiple computers as a server system, such as in a cloud computing environment. In another embodiment, server computer 112 can be a laptop computer, a tablet computer, a netbook computer, a personal computer (PC), a desktop computer, a personal digital assistant (PDA), a smart phone, or any programmable electronic device capable of communicating with requestor computing device 104, provider computing device 108, provider computing device 110, and other computing devices (not shown) within distributed data processing environment 100 via network 102. In another embodiment, server computer 112 represents a computing system utilizing clustered computers and components (e.g., database server computers, application server computers, etc.) that act as a single pool of seamless resources when accessed within distributed data processing environment 100. Server computer 112 includes blockchain ledger system 114, cognitive blockchain mediator 116, and database 118. Server computer 112 may include internal and external hardware components, as depicted and described in further detail with respect to FIG. 4.

Blockchain ledger system 114 is one or more of a plurality of systems known in the art which can be used to store records of digital value, for example, transactions, identities, assets, documents, and properties, into an immutable ledger, or to add self-enforcing business logic to the ledger, such as smart contracts. In one embodiment, blockchain ledger system 114 is permissionless, i.e., a public blockchain system open for participation to anyone. In another embodiment, blockchain ledger system 114 is permissioned, i.e., a private blockchain system available only to a closed group of participants.

Cognitive blockchain mediator 116 leverages NLP and other cognitive technologies to capture natural interaction between parties, extract relevant features from the interactions, identify the most relevant smart contract template, and dynamically modify a draft smart contract, based on the identified template, to match the needs of the parties. In the depicted embodiment, cognitive blockchain mediator 116 is a standalone program. In another embodiment, cognitive blockchain mediator 116 may be integrated into blockchain ledger system 114. In response to receiving a request for service, cognitive blockchain mediator 116 extracts relevant features from the request and determines the closest smart contract template to the request. Cognitive blockchain mediator 116 receives responses to the request from one or more service providers and generates a draft smart contract. Cognitive blockchain mediator 116 determines whether the draft smart contract requires modification to meet the needs of the requester and the one or more providers. In response to determining modification is required, cognitive blockchain mediator 116 submits the draft smart contract to the requestor and providers for further input. Once the draft smart contract includes all required features, cognitive blockchain mediator 116 generates a smart contract from the draft smart contract and submits the smart contract to blockchain ledger system 114. Cognitive blockchain mediator 116 is depicted and described in further detail with respect to FIG. 2 and FIG. 3.

Database 118 is a repository for data used by blockchain ledger system 114 and cognitive blockchain mediator 116. In the depicted embodiment, database 118 resides on server computer 112. In another embodiment, database 118 may reside elsewhere within distributed data processing environment 100 provided blockchain ledger system 114 and cognitive blockchain mediator 116 have access to database 118. A database is an organized collection of data. Database 118 can be implemented with any type of storage device capable of storing data and configuration files that can be accessed and utilized by blockchain ledger system 114 and cognitive blockchain mediator 116, such as a database server, a hard disk drive, or a flash memory. Database 118 stores a plurality of smart contract templates for transactions that may occur within blockchain ledger system 114. Database 118 may also store additional smart contract templates that are not associated with blockchain ledger system 114. Database 118 may also store modified templates for further use in a subsequent transaction.

Figure 2:
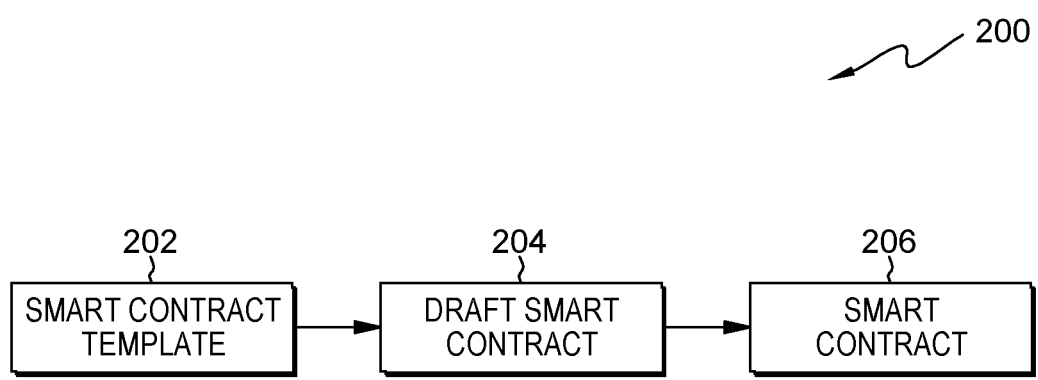
FIG. 2 is a flow diagram illustrating the transformation of a smart contract template to a smart contract by a cognitive blockchain mediator, within the distributed data processing environment of FIG. 1, in accordance with an embodiment of the present invention.

FIG. 2 is flow diagram 200 illustrating the transformation of a smart contract template to a smart contract by cognitive blockchain mediator 116, within distributed data processing environment 100 of FIG. 1, in accordance with an embodiment of the present invention.

Smart contract template 202 represents one or more smart contract templates, each of which is a starting point for drafting a smart contract. A smart contract template may be used in a plurality of scenarios where smart contracts are executed, for example, real estate, banking, various services, and product purchases. Cognitive blockchain mediator 116 starts the process of generating a smart contract by comparing a plurality of smart contract templates stored in database 118, and choosing one or more templates, such as smart contract template 202, which are closest to matching the required features in a smart contract requested by a user for a service.

After receiving additional information from the requestor of a smart contract, if needed, and responses from one or more potential providers of the requested service, cognitive blockchain mediator 116 generates a draft smart contract, such as draft smart contract 204. Cognitive blockchain mediator 116 fills in any blanks in smart contract template 202 with the received information to create draft smart contract 204.

Cognitive blockchain mediator 116 determines whether draft smart contract 204 meets the needs of the requestor and the providers or if draft smart contract 204 needs additional modification. Draft smart contract 204 may need additional modification if any of the required features are left blank, or if particular terms or conditions need to be added or removed. Cognitive blockchain mediator 116 reviews draft smart contract 204 for completeness to determine whether draft smart contract 204 needs any additional modification. Once all parties agree that draft smart contract 204 adequately addresses all needs and features required by the requestor and the one or more providers, and therefore needs no additional modification, cognitive blockchain mediator 116 generates smart contract 206 from draft smart contract 204 and submits smart contract 206 to be recorded on blockchain ledger system 114.

Figure 3:
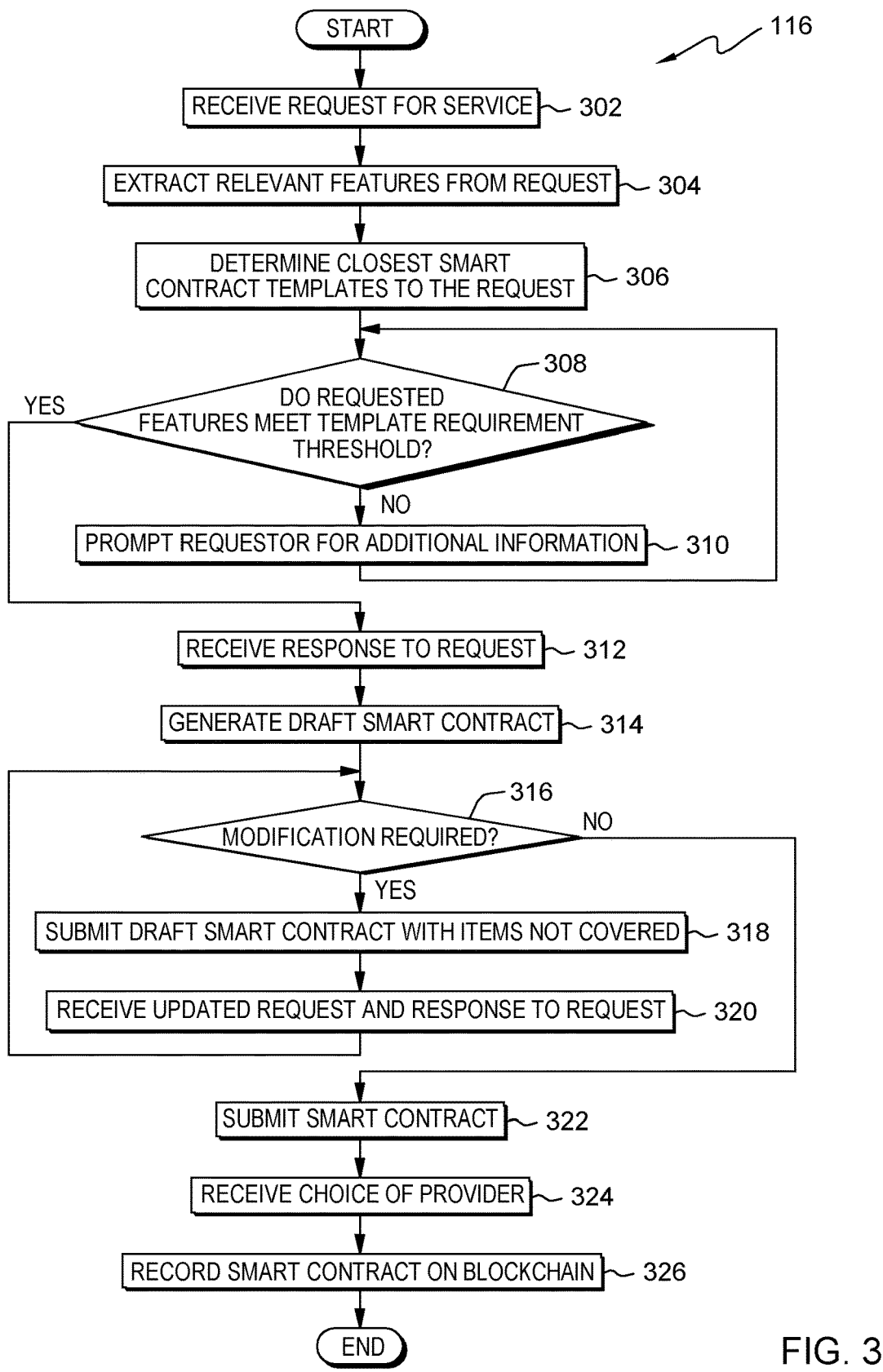
FIG. 3 is a flowchart depicting operational steps of the cognitive blockchain mediator, on a server computer within the distributed data processing environment of FIG. 1, for creation of blockchain smart contracts, in accordance with an embodiment of the present invention.

FIG. 3 is a flowchart depicting operational steps of cognitive blockchain mediator 116, on server computer 112 within distributed data processing environment 100 of FIG. 1, for creation of blockchain smart contracts, in accordance with an embodiment of the present invention.

Cognitive blockchain mediator 116 receives a request for a service (step 302). Cognitive blockchain mediator 116 receives a request for a service when a requestor, i.e., a user of requestor computing device 104, submits the request to blockchain ledger system 114, via user interface 105. In one embodiment, the requestor submits the request in natural language. The requestor may submit the request via speech, text, images, video, etc. The service requested may be, for example, to borrow money, to buy merchandise such as a house or a product, or to obtain a service, such as a home repair or cable service. In one embodiment, blockchain ledger system 114 sends the request to cognitive blockchain mediator 116.

Cognitive blockchain mediator 116 extracts relevant features from the request (step 304). Natural language processing (NLP) is a field of computer science, artificial intelligence, and linguistics concerned with the interactions between computers and human (natural) languages. As would be recognized by a person of skill in the art, cognitive blockchain mediator 116 uses NLP to analyze the received request and extract features or attributes, such as intents, emotions, entities, image information, and other textual information. Entities are words of interest that share a common property and may include, for example, people, places or things. For example, if the request is to buy a house, features may include a location, such as a city or state, a price range, a size, a time frame for purchase, a sense of urgency, etc. By extracting features of the request, cognitive blockchain mediator 116 can determine the context of the request with respect to available smart contract templates stored in database 118.

Cognitive blockchain mediator 116 determines the closest smart contract templates to the request (step 306). Cognitive blockchain mediator 116 compares the extracted features from the received request to one or more smart contract templates stored in database 118 and determines one or more smart contract templates that are the closest appropriate templates for the request. In one embodiment, the comparison is made across N dimensional space, where N represents an integer greater than two that quantifies the number of features included in the request. For example, if the request is to buy a house, and the features are location, price, size, time frame, and sense of urgency, then N equal five. Cognitive blockchain mediator 116 may use one or more of a plurality of techniques known in the art to perform the comparison. In one embodiment, cognitive blockchain mediator 116 may employ a ranking or scoring technique to determine the closest smart contract template. For example, cognitive blockchain mediator 116 may determine the number of features from the request that are included in each available smart contract template, and score the smart contract templates based on the number of required features included.

Cognitive blockchain mediator 116 determines whether the requested features meet a requirement threshold of the closest smart contract templates (decision block 308). In order to use one or more of the closest smart contract templates, cognitive blockchain mediator 116 determines whether the minimum required features of the templates are well defined in the request. In one embodiment, the minimum required features are defined by the smart contract template author. In an embodiment where cognitive blockchain mediator 116 includes a machine learning component, cognitive blockchain mediator 116 may modify smart contract templates over time to require other features that were not initially required, but have been added to smart contracts in the past.

If cognitive blockchain mediator 116 determines the requested features do not meet a requirement threshold of the closest smart contract templates ("no" branch, decision block 308), then cognitive blockchain mediator 116 prompts the requestor for additional information (step 310). If cognitive blockchain mediator 116 could not extract enough features to meet the requirement threshold required by the closest smart contract templates from the request, then cognitive blockchain mediator 116 prompts the requestor to provide the missing features. In an embodiment, cognitive blockchain mediator 116 may prompt the requestor, via user interface 105, using one of a plurality of messaging techniques known in the art. After receiving additional information from the requestor, cognitive blockchain mediator 116 returns to decision block 308 to determine if all required features are available.

If cognitive blockchain mediator 116 determines that the closest smart contract templates meet a requirement threshold ("yes" branch, decision block 308), then cognitive blockchain mediator 116 receives a response to the request from one or more service providers (step 312). As one or more users of blockchain ledger system 114, for example, the users of provider computing device 108 and provider computing device 110, respond to the request for service, cognitive blockchain mediator 116 receives the response. In an embodiment, cognitive blockchain mediator 116 uses one or more NLP techniques to extract information from the responses. In one embodiment, cognitive blockchain mediator 116 may define a timeframe within which all responses are required to be received. For example, cognitive blockchain mediator 116 may accept responses up to a week or a month from the receipt of the request for service. In one embodiment, blockchain ledger system 114 sends the response to cognitive blockchain mediator 116.

Cognitive blockchain mediator 116 generates a draft smart contract (step 314). Based on the received request, the received one or more responses, and the closest smart contract templates, cognitive blockchain mediator 116 chooses a smart contract template and generates a draft smart contract that contains the requested features and one or more conditions stipulated in the responses. In one embodiment, cognitive blockchain mediator 116 may determine that the currently available smart contract templates are inadequate for the current request. For example, cognitive blockchain mediator 116 may determine that, based on the request and the responses, a combination of two or more smart contract templates is the best solution. In another example, cognitive blockchain mediator 116 may determine that the closest smart contract template requires significant changes to meet the needs of the request and the response. In the embodiment, cognitive blockchain mediator 116 may dynamically draft a new smart contract template based on the received request and the received one or more responses, and use the new smart template as the basis for the draft smart contract. In the embodiment where cognitive blockchain mediator 116 dynamically drafts a new smart contract template, cognitive blockchain mediator 116 stores the new smart contract template in database 118 for subsequent use.

Cognitive blockchain mediator 116 determines whether the draft smart contract requires modification (decision block 316). Cognitive blockchain mediator 116 reviews the draft smart contract for completeness and determines whether there are any items that are not covered. In one embodiment, cognitive blockchain mediator 116 may perform a gap analysis on the draft smart contract. For example, the draft smart contract itself may need modification to include terms or conditions that were not included in the closest smart contract template. In another example, the draft smart contract terms may be complete, however there may be gaps in the information extracted from the request or from the responses with which cognitive blockchain mediator 116 fills in the terms or conditions. In either case, the draft smart contract may need modification. In one embodiment, cognitive blockchain mediator 116 may determine that for a particular type of contract or transaction, there is a minimum requirement of items that must be included, and cognitive blockchain mediator 116 determines whether the minimum requirement is filled. In addition, cognitive blockchain mediator 116 may have learned from previous smart contract transactions that the scenario for which the current draft smart contract is used requires additional details. For example, cognitive blockchain mediator 116 may have learned that for a real estate transaction in a particular state, specific details of the address are required.

If cognitive blockchain mediator 116 determines the draft smart contract requires modification ("yes" branch, decision block 316), then cognitive blockchain mediator 116 submits the draft smart contract with items not covered (step 318). Cognitive blockchain mediator 116 submits the draft smart contract to blockchain ledger system 114 such that the user of requestor computing device 104 and the one or more service providers that responded to the request, for example, the users of provider computing device 108 and provider computing device 110, may review the draft and determine what information is missing in order to complete the smart contract, via user interface 105, user interface 109, and user interface 111, respectively. In an embodiment, cognitive blockchain mediator 116 highlights the areas in the draft smart contract for which additional information is needed. In an embodiment where the items that are not covered are solely the responsibility of the requestor, cognitive blockchain mediator 116 submits the draft to the attention of the requestor. In an embodiment where the items that are not covered are solely the responsibility of the one or more providers, cognitive blockchain mediator 116 submits the draft smart contract to the attention of the one or more providers that need to add additional information to the draft smart contract. In one embodiment, cognitive blockchain mediator 116 may provide one or more suggestions for the items that are not covered.

Cognitive blockchain mediator 116 receives an updated request and response to the updated request (step 320). In response to receiving the draft smart contract with items not covered, the user of requestor computing device 104 and the one or more service providers that responded to the request, for example, the users of provider computing device 108 and provider computing device 110, provide the missing information, via user interface 105, user interface 109, and user interface 111, respectively, to complete the smart contract. In an embodiment where the items that are not covered are solely the responsibility of the requestor, cognitive blockchain mediator 116 receives the updated request from the requestor. In an embodiment where the items that are not covered are solely the responsibility of the one or more providers, cognitive blockchain mediator 116 receives the response from the one or more providers that needed to add additional information to the draft smart contract. In response to receiving the updated request and response to the updated request, cognitive blockchain mediator 116 returns to decision block 316 to determine whether the draft smart contract requires any additional modification. In one embodiment, cognitive blockchain mediator 116 may determine that the current draft smart contract is inadequate for the updated request or response. For example, cognitive blockchain mediator 116 may determine that a new subclause is required to be added to cover a particular term or condition. In the embodiment, cognitive blockchain mediator 116 may dynamically draft a new draft smart contract. In the embodiment where cognitive blockchain mediator 116 dynamically drafts a new draft smart contract, cognitive blockchain mediator 116 may store the new draft smart contract as a template in database 118 for subsequent use.

Responsive to determining the draft smart contract does not require modification ("no" branch, decision block 316), cognitive blockchain mediator 116 generates and submits the smart contract (step 322). When all terms and conditions are defined to the satisfaction of the requestor and the one or more providers, cognitive blockchain mediator 116 submits a smart contract to blockchain ledger system 114 for review by the requestor, i.e., the user of requestor computing device 104, and the one or more providers, for example, the users of provider computing device 108 and provider computing device 110, via user interface 105, user interface 109, and user interface 111, respectively.

Cognitive blockchain mediator 116 receives a choice of provider (step 324). As is known in the art, the smart contract executes on blockchain ledger system 114 via peer consensus for the best provider to respond to the request for service. In response to the execution of the peer consensus on blockchain ledger system 114, cognitive blockchain mediator 116 receives the choice of the provider that will provide the requested service to the requestor. For example, the peer consensus may choose the user of provider computing device 108 over the user of provider computing device 110. In one embodiment, blockchain ledger system 114 sends the choice of the provider to cognitive blockchain mediator 116.

Cognitive blockchain mediator 116 records the smart contract on blockchain ledger system 114 (step 326). In response to the receipt of the provider choice, cognitive blockchain mediator 116 records the smart contract on blockchain ledger system 114 with the required transactions. For example, if the provider choice was for the user of provider computing device 108, cognitive blockchain mediator 116 records the smart contract with required transactions between the user of requestor computing device 104 and provider computing device 108.

Figure 4:
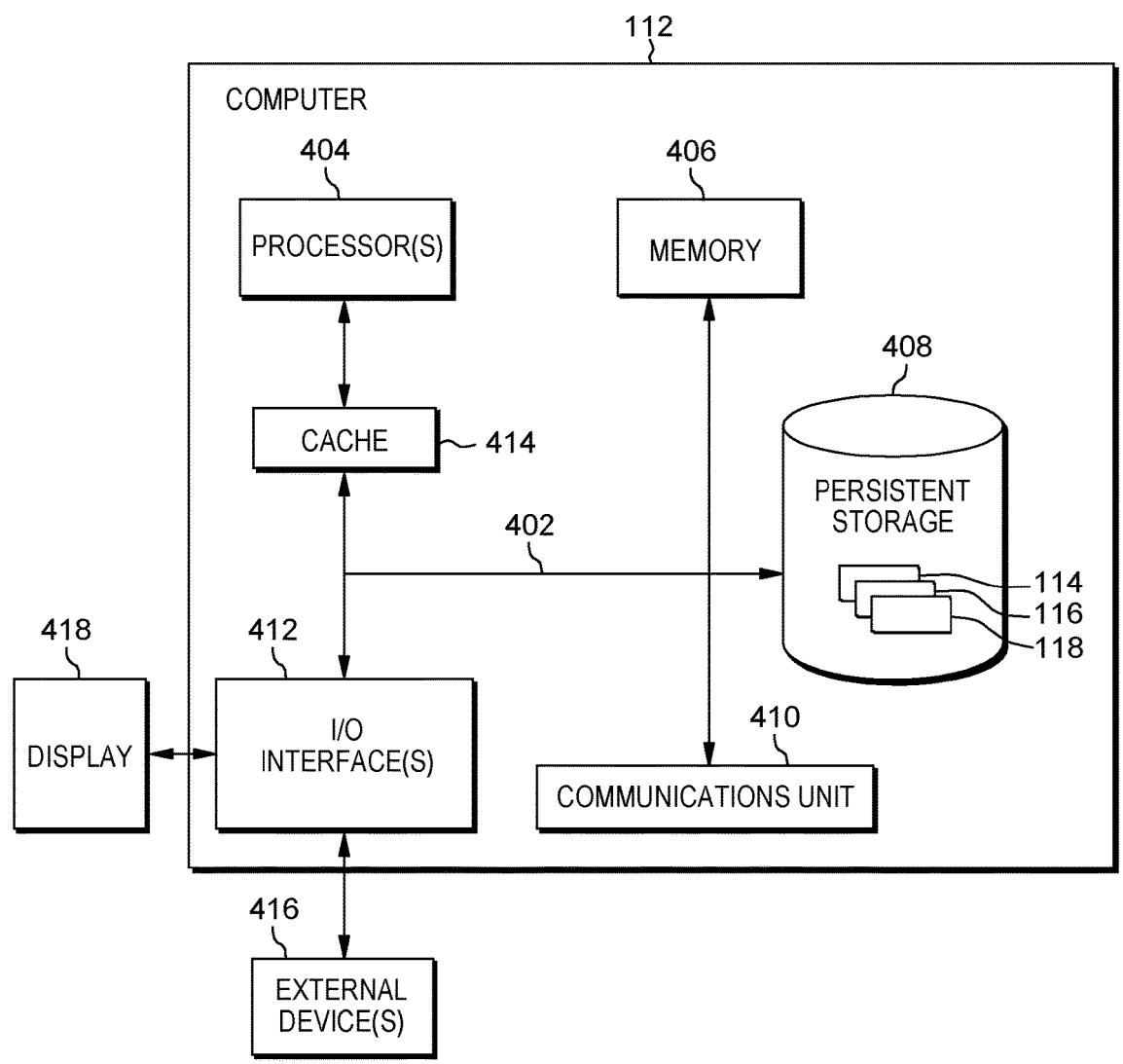
FIG. 4 depicts a block diagram of components of the server computer executing the cognitive blockchain mediator within the distributed data processing environment of FIG. 1, in accordance with an embodiment of the present invention.

FIG. 4 depicts a block diagram of components of server computer 112 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 112 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., blockchain ledger system 114, cognitive blockchain mediator 116, and database 118, can be stored in persistent storage 408 for execution and/or access by one or more of the respective processor(s) 404 of server computer 112 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of requestor computing device 104, provider computing device 108, and provider computing device 110. In these examples, communications unit 410 includes one or more network interface cards. Communications unit 410 may provide communications through the use of either or both physical and wireless communications links. Blockchain ledger system 114, cognitive blockchain mediator 116, and database 118 may be downloaded to persistent storage 408 of server computer 112 through communications unit 410.

I/O interface(s) 412 allows for input and output of data with other devices that may be connected to server computer 112. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., blockchain ledger system 114, cognitive blockchain mediator 116, and database 118 on server computer 112, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for generating blockchain smart contracts, the computer program product comprising:
one or more computer readable storage devices and program instructions stored on the one or more computer readable storage devices, the stored program instructions comprising:
program instructions to detect a conversation between a user and a service provider, wherein the conversation is in natural language text;

program instructions to map the conversation into a request by the user for a service to be performed by the service provider;

program instructions to extract one or more relevant features from the natural language text using one or more natural language processing techniques, wherein the one or more relevant features indicate a context of the request;

based, at least in part, on the extracted one or more relevant features, program instructions to determine two or more smart contract templates associated with the request;

program instructions to determine a quantity of the one or more relevant features of the request associated with each of the two or more smart contract templates;

based, at least in part, on the quantity of the one or more relevant features of the request associated with each of the two or more smart contract templates, program instructions to assign a score to each of the two or more smart contract templates;

program instructions to determine a first smart contract template of the two or more smart contract templates for which the score is highest;

program instructions to receive one or more responses to the request from the service provider;

based, at least in part on the determined first smart contract template and the one or more received responses, program instructions to generate a draft smart contract; and program instructions to add the draft smart contract to a blockchain ledger.

2. The computer program product of claim 1, the stored program instructions further comprising:

program instructions to determine whether the extracted one or more relevant features meet a minimum required threshold of the two or more determined smart contract templates; and responsive to determining the extracted one or more relevant features do not meet a minimum required threshold of the two or more determined smart contract templates, program instructions to prompt the user for additional information.

3. The computer program product of claim 1, the stored program instructions further comprising:

program instructions to determine whether the draft smart contract requires modification;

program instructions to submit the draft smart contract to the user and to the service provider for additional information needed to generate a smart contract;

program instructions to receive at least one of a response from the user and a response from the service provider;

program instructions to generate the smart contract, based, at least in part, on the received at least one of the response from the user and the response from the service provider; and program instructions to submit the smart contract to a blockchain ledger.

4. The computer program product of claim 1, wherein the one or more relevant features are selected from the group consisting of intents, emotions, entities, image information, and textual information.

5. The computer program product of claim 1, wherein the program instructions to determine the two or more smart contract templates associated with the request comprise program instructions to compare the two or more smart contract templates to the one or more extracted features across N dimensional space, where N represents an integer greater than two that quantifies a number of features included in the request.

6. The computer program product of claim 1, wherein the request for a service is selected from the group consisting of borrowing money, buying merchandise, and obtaining a service.

7. The computer program product of claim 1, the stored program instructions further comprising program instructions to determine the extracted one or more relevant features meet a minimum required threshold of the two or more determined smart contract templates.

8. The computer program of claim 1, further comprising:

program instructions to determine that the two or more smart contract templates associated with the request require significant changes to meet one or more needs of the request and of the one or more received responses; and based, at least in part, on the request and the one or more received responses, program instructions to dynamically draft a new smart contract template.

9. A computer system for generating blockchain smart contracts, the computer system comprising:

one or more computer processors;

one or more computer readable storage devices;

program instructions stored on the one or more computer readable storage devices for execution by at least one of the one or more computer processors, the stored program instructions comprising:

program instructions to detect a conversation between a user and a service provider, wherein the conversation is in natural language text;

program instructions to map the conversation into a request by the user for a service to be performed by the service provider;

program instructions to extract one or more relevant features from the natural language text using one or more natural language processing techniques, wherein the one or more relevant features indicate a context of the request;

based, at least in part, on the extracted one or more relevant features, program instructions to determine two or more smart contract templates associated with the request;

program instructions to determine a quantity of the one or more relevant features of the request associated with each of the two or more smart contract templates;

based, at least in part, on the quantity of the one or more relevant features of the request associated with each of the two or more smart contract templates, program instructions to assign a score to each of the two or more smart contract templates;

program instructions to determine a first smart contract template of the two or more smart contract templates for which the score is highest;

program instructions to receive one or more responses to the request from the service provider;

based, at least in part on the determined first smart contract template and the one or more received responses, program instructions to generate a draft smart contract; and program instructions to add the draft smart contract to a blockchain ledger.

10. The computer system of claim 9, the stored program instructions further comprising:

program instructions to determine whether the extracted one or more relevant features meet a minimum required threshold of the two or more determined smart contract templates; and responsive to determining the extracted one or more relevant features do not meet a minimum required threshold of the two or more determined smart contract templates, program instructions to prompt the user for additional information.

11. The computer system of claim 9, the stored program instructions further comprising:

program instructions to determine whether the draft smart contract requires modification;

program instructions to submit the draft smart contract to the user and to the service provider for additional information needed to generate a smart contract;

program instructions to receive at least one of a response from the user and a response from the service provider;

program instructions to generate the smart contract, based, at least in part, on the received at least one of the response from the user and the response from the service provider; and program instructions to submit the smart contract to a blockchain ledger.

12. The computer system of claim 9, wherein the one or more relevant features are selected from the group consisting of intents, emotions, entities, image information, and textual information.

13. The computer system of claim 9, wherein the program instructions to determine the two or more smart contract templates associated with the request comprise program instructions to compare the two or more smart contract templates to the one or more extracted features across N dimensional space, where N represents an integer greater than two that quantifies a number of features included in the request.

* * * * *